US012698865B2

(12) United States Patent
Hjort, III

(10) Patent No.: US 12,698,865 B2
(45) **Date of Patent: *Aug. 4, 2026**

(54) SYSTEM FOR RECYCLING HELIUM

(71) Applicant: Commoditas, LLC, Denver, CO (US)

(72) Inventor: Carl A. Hjort, III, Denver, CO (US)

(73) Assignee: Commoditas, LLC, Denver, CO (US)

( * ) Notice: Subject to any disclaimer, the term of this patent is extended or adjusted under 35 U.S.C. 154(b) by 172 days.

This patent is subject to a terminal disclaimer.

(21) Appl. No.: 18/141,867

(22) Filed: May 1, 2023

(65) Prior Publication Data

US 2023/0265970 A1 Aug. 24, 2023

Related U.S. Application Data

(63) Continuation-in-part of application No. 17/230,771, filed on Apr. 14, 2021, now Pat. No. 11,638,883.
(Continued)

(51) Int. Cl.
*F17C 5/06* (2006.01)
*A63H 27/10* (2006.01)

(52) U.S. Cl.
CPC ............... *F17C 5/06* (2013.01); *A63H 27/10* (2013.01); *A63H 2027/1033* (2013.01);
(Continued)

(58) Field of Classification Search
CPC ................ F17C 5/06; F17C 2205/0326; F17C 2205/0329; F17C 2205/0335;
(Continued)

(56) References Cited

U.S. PATENT DOCUMENTS 3,357,128 A * 12/1967 Geiser .................... A63H 37/00 446/181
4,201,387 A * 5/1980 Revermann ......... A63F 3/00006 273/243
(Continued)

FOREIGN PATENT DOCUMENTS

CN 2304891 Y * 1/1999
CN 201338724 Y * 11/2009
(Continued)

OTHER PUBLICATIONS

JP-2001039498-A English Translation of Specification (Year: 2025).*
(Continued)

*Primary Examiner* — Kenneth Rinehart
*Assistant Examiner* — Stephanie A Shrieves

(57) ABSTRACT

A system for recycling helium comprising a bursting chamber with a re-sealable lid and a vent; a bursting mechanism disposed inside the bursting chamber; wherein the bursting chamber is in fluid communication with a compressor; wherein an output of the compressor is in fluid communication with an evacuation valve and a control valve; wherein when the evacuation valve is opened and the control valve is closed the compressor evacuates the air from the bursting chamber; and wherein when the evacuation valve is closed and the control valve is opened, and the bursting mechanism is activated, compressed helium gas recovered from balloons burst in the bursting chamber flows through the control valve into a helium storage tank.

19 Claims, 6 Drawing Sheets

Related U.S. Application Data

(60) Provisional application No. 63/010,428, filed on Apr. 15, 2020.

(52) U.S. Cl.
CPC ................. *F17C 2205/0326* (2013.01); *F17C 2205/0329* (2013.01); *F17C 2205/0335* (2013.01); *F17C 2221/017* (2013.01); *F17C 2227/0164* (2013.01); *F17C 2250/043* (2013.01)

(58) Field of Classification Search
CPC ........ F17C 2221/017; F17C 2227/0164; F17C 2250/043; A63H 27/10; A63H 2027/1033
USPC ........................................................... 141/65
See application file for complete search history.

(56) References Cited

U.S. PATENT DOCUMENTS

| | | | | | |
|---|---|---|---|---|---|
| 4,227,497 | A * | 10/1980 | Mathieson | F02M 13/08 | 261/16 |
| 5,018,551 | A * | 5/1991 | Pelissier | C21D 1/613 | 141/66 |
| 5,058,631 | A * | 10/1991 | Grant | F25B 45/00 | 141/315 |
| 5,368,067 | A * | 11/1994 | Cook, Jr. | F17B 1/26 | 137/485 |
| 5,527,222 | A * | 6/1996 | Demita | A63H 37/00 | 472/51 |
| 6,402,582 | B1 * | 6/2002 | Sherer | A63H 27/10 | 273/458 |
| 6,899,115 | B1 * | 5/2005 | Adler | F17C 5/06 | 141/2 |
| 2005/0000802 | A1 * | 1/2005 | Hobbs | F17C 9/04 | 205/637 |

FOREIGN PATENT DOCUMENTS

| | | | | |
|---|---|---|---|---|
| GB | 2461394 | A * | 1/2010 | A63H 27/10 |
| JP | 2001039498 | A * | 2/2001 | |
| JP | 2010276566 | A * | 12/2010 | |
| JP | 2011179628 | A * | 9/2011 | F17D 1/07 |
| KR | 20100058937 | A * | 6/2010 | F17C 5/06 |

OTHER PUBLICATIONS

JP-2010276566-A English Translation of Specification (Year: 2022).*
"Compressor Basics: Types of Compressors." Air Compressor Works, Inc., Aug. 25, 2017 [Retrieved on Jun. 9, 2025. Retrieved from the Internet URL: https://aircompressorworks.com/types-of-compressors/] (Year: 2025).*
CN-201338724-Y English Translation of Specification (Year: 2022).*
KR-20100058937-A English Translation of Specification (Year: 2022).*
JP-2011179628-A English Translation of Specification (Year: 2022).*
CN-2304891-Y English Translation of Specification (Year: 2022).*

* cited by examiner

SYSTEM FOR RECYCLING HELIUM

CROSS-REFERENCE TO RELATED APPLICATIONS

This application is a continuation-in-part of U.S. patent application Ser. No. 17/230,771, filed Apr. 14, 2021, now U.S. Pat. No. 11,638,883, issued May 2, 2023, which claims the benefit of U.S. Provisional Patent Application Ser. No. 63/010,428 filed on Apr. 15, 2020, all having the same title and incorporated by reference herein.

DETAILED DESCRIPTION OF THE DRAWINGS

Figure 1A:
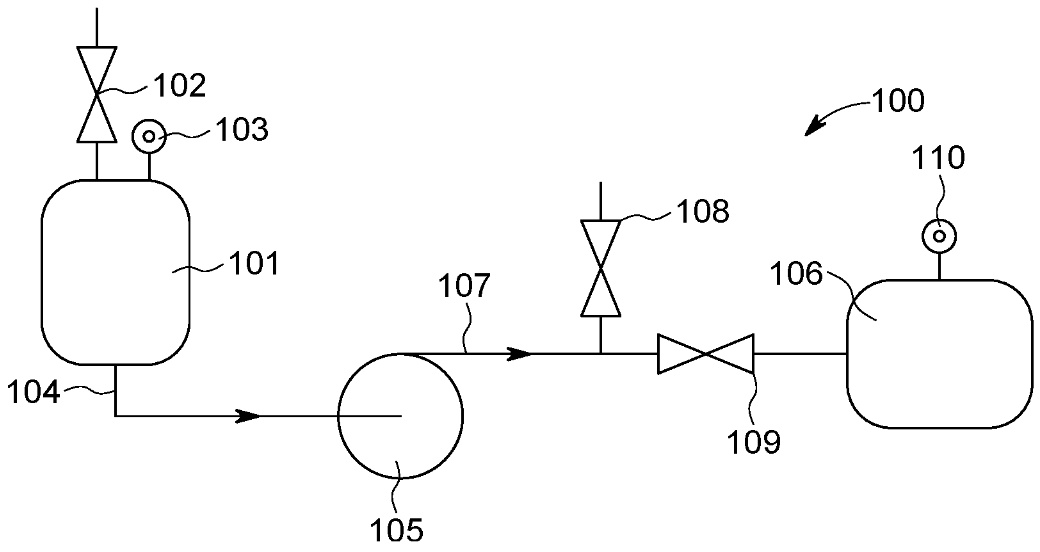
FIGS. 1*a* and 1*b* are a process flow diagram of the system for recycling helium.
Figure 1B:
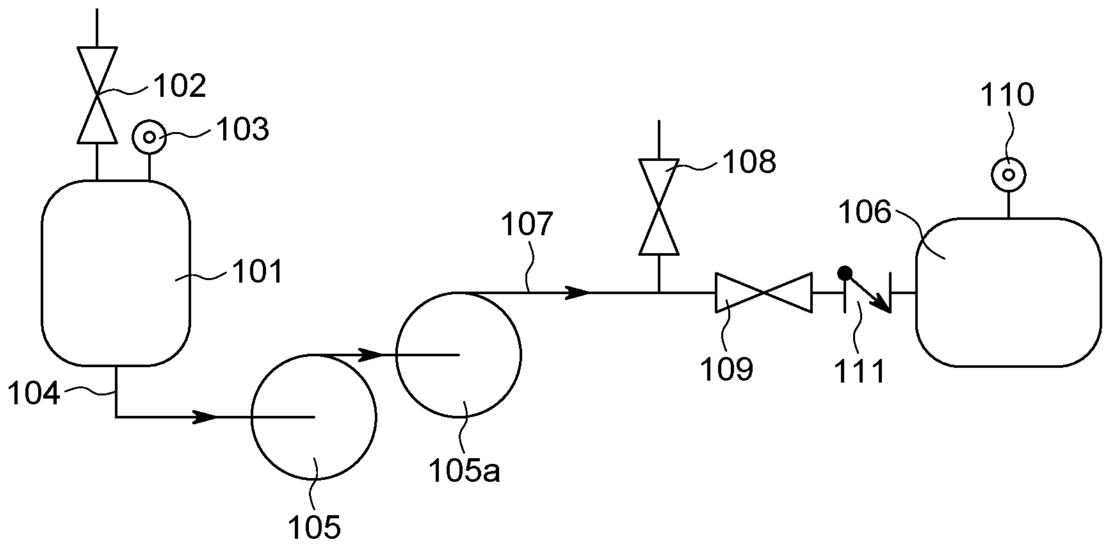

FIGS. 1*a* and 1*b* shows a process flow diagram of the system for recycling helium gas 100. Thus, in FIGS. 1*a* and 1*b* the process begins in a bursting chamber 101. The bursting chamber 101 is a pressure vessel that is capable of withstanding significant vacuum. By way of example, and without limitation, the bursting chamber may be able to structurally withstand a vacuum of up to 29.92 inches of mercury. The bursting chamber may be constructed of steel or acrylic polymer or other materials known in the art for fabricating chambers capable of withstanding significant vacuums. The bursting chamber 101 is equipped with a re-sealable lid, which will be discussed in greater detail below. Inside the bursting chamber 101 is bursting mechanism (not shown) which will also be discussed in greater detail below. The bursting chamber 101 may be provided with a vent 102. In the process flow diagram of FIGS. 1*a* and 1*b*, the vent 102 is a valve that may be opened to allow the bursting chamber 101 to equalize its pressure with the atmosphere. Any mechanism known in the art to allow the bursting chamber 101 to come to equal pressure with the atmosphere may be used as the vent 102 in the system 100. By way of example and without limitation, the vent 102 may be a manually-controlled valve or it may be an electrically actuated valve, particularly in cases where the process described in FIGS. 1*a* and 1*b* is automatically controlled. Additionally, the bursting chamber 101 may be provided with a pressure indicator 103. In one embodiment the pressure indicator 103 may be a gauge. It should be appreciated that the pressure indicator 103 may also be an electrically-operated pressure sensor, particularly in cases where the process described in FIGS. 1*a* and 1*b* is automatically controlled.

As can be seen in FIGS. 1*a* and 1*b*, the bursting chamber 101 is connected via line 104 to a compressor 105, thus the bursting chamber 101 and compressor 105 are in fluid communication. As will be discussed in greater detail below, the compressor 105 performs two functions in the process described in FIGS. 1*a* and 1*b*. First, the compressor 105 evacuates the air from the bursting chamber 101, prior to the initiation of the bursting process. Second, once the balloons charged to the bursting chamber 101 have been burst, the compressor 105 compresses the resulting helium gas and transfers the compressed helium gas into the helium storage tank 106. The compressor 105 may be any compressor known in the art, including both positive displacement compressors as well as dynamic compressors. The compressor 105 may be cooled by air, water or other fluids or it may be un-cooled. The compressor 105 may have a single stage or it may have multiple stages, depending on the desired final pressure of helium in the helium storage tank 106. It also should be appreciated that two or more compressors 105 and 105*a* could be operated in series to achieve the desired final pressure of helium in the helium storage tank 106, as shown in FIG. 1*b*. The compressor 105 may be manually-controlled or it may be electrically-actuated, particularly in cases where the process described in FIGS. 1*a* and 1*b* is automatically controlled.

Disposed between the output 107 of compressor 105 and the helium storage tank 106 are the evacuation valve 108 and the control valve 109. As discussed above, the compressor 105 evacuates the air from the bursting chamber 101. To do so, the evacuation valve 108 is opened and control valve 109 is closed. Compressor 105 is then activated, drawing air out of the bursting chamber 101 and venting it out of evacuation valve 108. When all the air has been evacuated from the bursting chamber 101, evacuation valve 108 may be closed, and then control valve 109 can be opened. The bursting process (discussed below) can then take place, and the resultant compressed helium gas flows through control valve 109 into helium storage tank 106. When all of the helium gas has been evacuated from the bursting chamber 101, the control valve 109 may be closed to retain the compressed helium gas in the helium storage tank 106. The evacuation valve 108 may also perform the function of draining any condensate that collects in the output 107 of compressor 105. It should be appreciated that evacuation valve 108 and control valve 109 may be any types of valve known in the art and suitable for use with compressed gasses. By way of example and without limitation, either or both of the evacuation valve 108 and control valve 109 may be manually-controlled valves or they may be electrically actuated valves, particularly in cases where the process described in FIGS. 1*a* and 1*b* is automatically controlled. Control valve 109 may further be provided with a one-way check valve fitting 111 to prevent the backflow of compressed helium gas out of the helium storage tank 106 into the system 100.

The helium storage tank 106 may be used to store helium recovered by the system 100. The helium storage tank 106 may be fitted with a pressure indicator 110 to indicate the pressure of the recycled helium in the tank. The pressure indicator 110 may be a gauge or an electrically operated pressure sensor. The recycled helium collected in helium storage tank 106 may be used in a number of different ways. First, the recycled helium may be used as-is to fill new balloons. Second, the recycled helium may be blended with virgin helium and then used to fill new balloons. Finally, helium storage tanks 106 from numerous installations at various locations may be collected to a central location, and their contents may be purified and/or compressed to a higher pressure and the resultant purified and/or compressed helium could be reused for filling balloons. Alternatively, in all three of the foregoing scenarios, the helium could be re-purposed for a use other than filling balloons.

Figure 2:
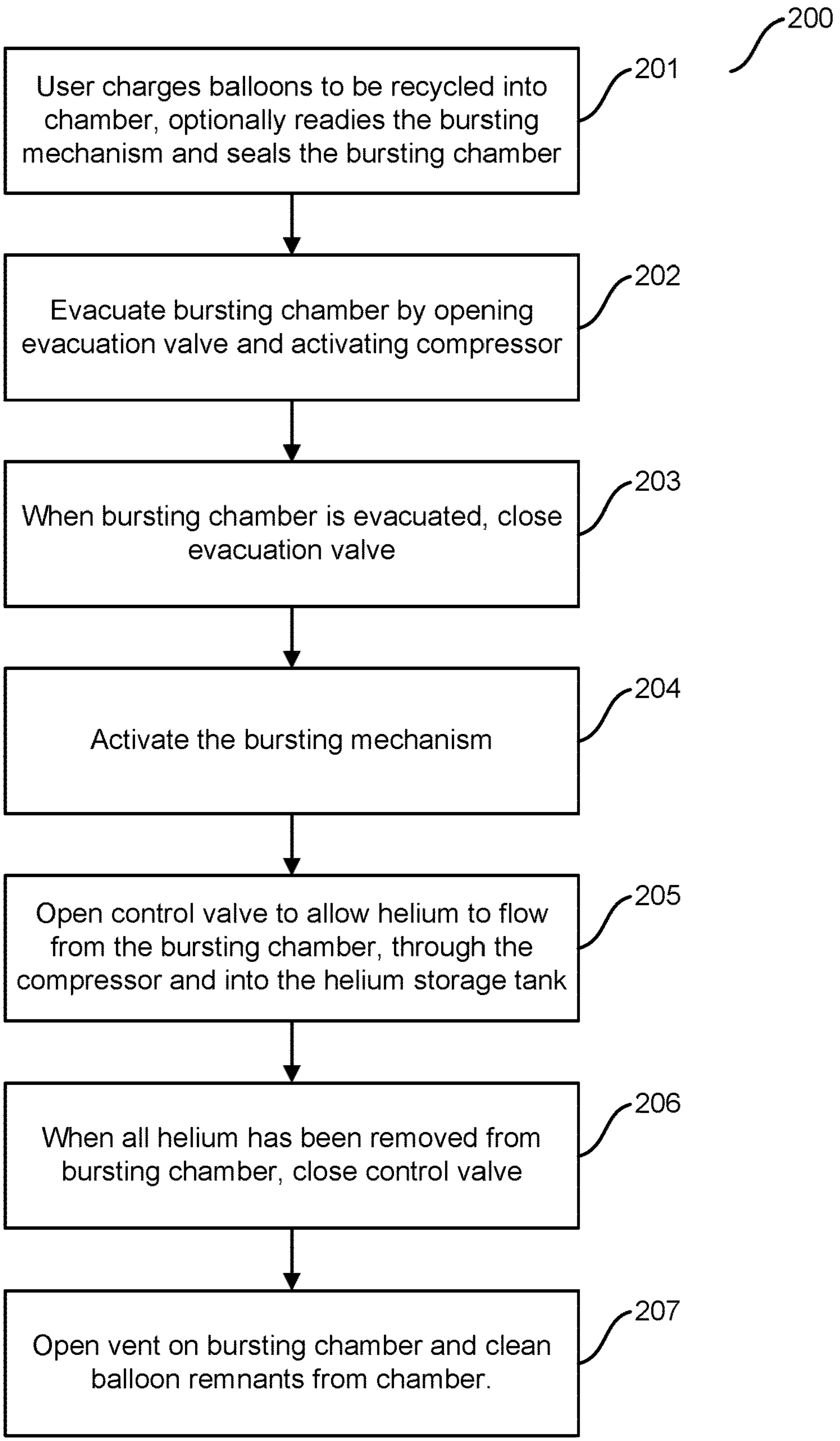
FIG. 2 is a flowchart setting forth the method of operating the system.

FIG. 2 shows a flowchart of the process 200 of recycling helium. In step 201, a user charges balloons to be recycled into, optionally readies the bursting mechanism, and seals, the bursting chamber. As recited above, the bursting chamber is provided with a resealable lid. By way of example, and without limitation, the bursting chamber lid may have an o-ring disposed between the lid and the body of the chamber, and the lid may be secured to the body of the chamber by clamps. Alternatively, the bursting chamber lid may have a gasket disposed between the lid and the body of the chamber and the lid may be secured to the body by nuts and threaded studs. One of ordinary skill in the art will appreciate that any lid sealing arrangement can be used to seal the bursting chamber so long as it is suitable for use with the substantial vacuum used in this process. It may also be necessary in this step for the user to ready the bursting mechanism. Several embodiments of bursting mechanisms are discussed below. In some embodiments of the bursting mechanism, the user may be required to position, cock, assemble or otherwise make ready the bursting mechanism so it can be activated at the required time. These preparations must be made prior to sealing the bursting chamber.

In step 202, the bursting chamber is evacuated by opening the evacuation valve and activating compressor. If the process is being conducted manually, the user my open the valve manually and turn on the compressor. Alternatively, if the process is automated, the user may simply activate the system, and appropriate process controls automatically open the valve and activate the compressor.

In step 203, when the bursting chamber is evacuated, the evacuation valve is closed. The bursting chamber is evacuated when the pressure indicator on the bursting chamber indicates there is a desired amount of vacuum in the chamber. If the process is being conducted manually, the user may close the valve manually. Alternatively, if the process is automated, appropriate process controls automatically close the valve upon receiving an appropriate signal of the presence of vacuum from the pressure indicator on the bursting chamber.

In step 204, the bursting mechanism is activated, either automatically by the system or by input from the user. The bursting mechanism bursts the balloons contained in the bursting chamber. In step 205, either the user manually, or the system automatically, opens the control valve to allow helium to flow from the bursting chamber, through the compressor and into the helium storage tank. In step 206, the control valve is closed when all helium has been removed from bursting chamber. All of the helium is removed from the chamber when the pressure indicator on the bursting chamber indicates there is a desired amount of vacuum in the chamber. If the process is being conducted manually, the user may close the valve manually. Alternatively, if the process is automated, appropriate process controls automatically close the valve upon receiving an appropriate signal of the presence of vacuum from the pressure indicator on the bursting chamber. Finally, in step 207, the vent on bursting chamber is opened and the user cleans balloon remnants from chamber. As with all the prior steps, the vent could be opened manually, or it could be opened automatically by the system. Opening the vent allows the pressure in the bursting chamber to equilibrate with atmospheric pressure, so the chamber can be opened.

Figure 3:
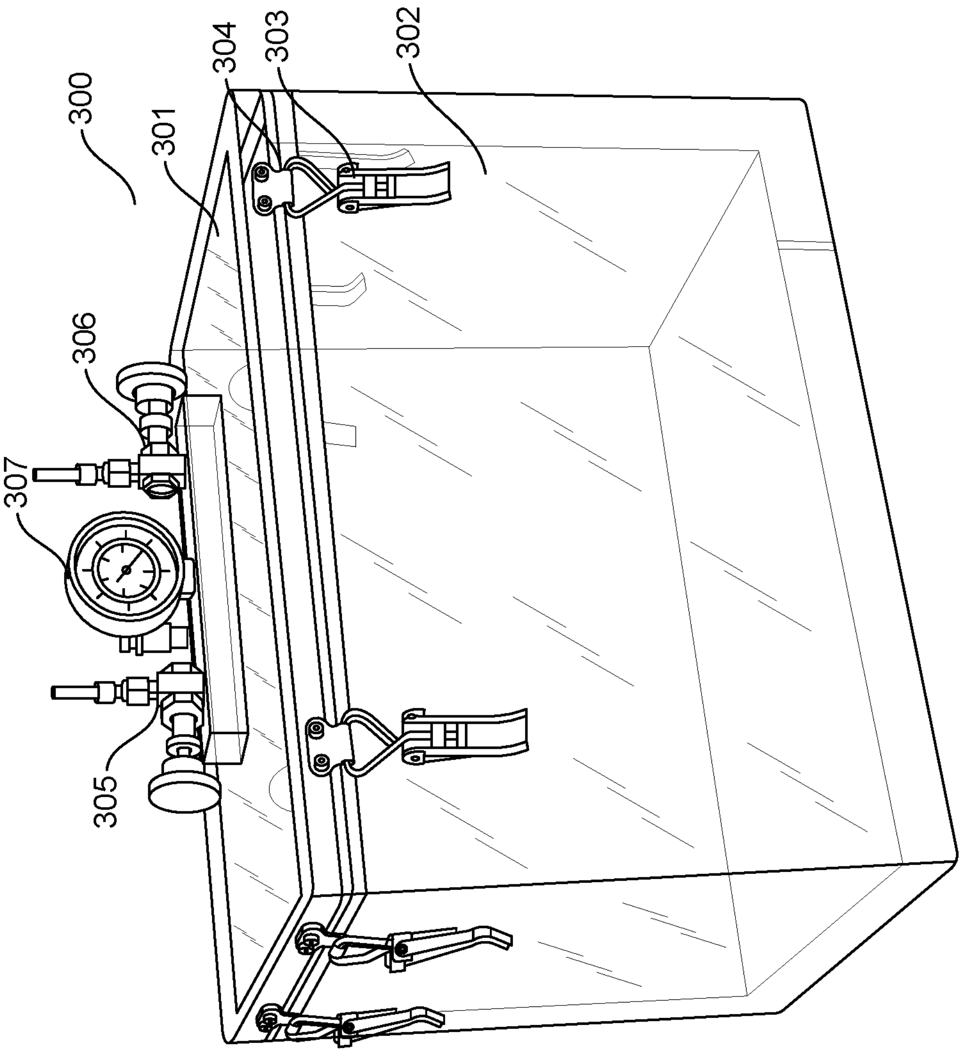
FIG. 3 shows an exemplary bursting chamber for the present system.

FIG. 3 shows an exemplary bursting chamber 300 for use with the present system. It should be appreciated that the bursting chamber shown in FIG. 3 does not have a bursting mechanism disposed within it. In use, one of the forms of bursting mechanisms shown and disclosed in FIGS. 4 through 10 are disposed inside the bursting chamber to accomplish the bursting function. As can be seen in FIG. 3, the bursting chamber 300 has a lid 301 and a body 302. In FIG. 3, the bursting chamber 300 is shown as a generally rectangular box, but it should be appreciated that the bursting chamber may take any shape known in the art, including without limitation, cylindrical shapes or cubes. The lid 301 is secured to the body 302 by clamps 303. An o-ring gasket 304 is disposed at the interface between the body 302 and lid 301 to ensure an airtight seal between them. While the specific embodiment shown in FIG. 3 uses the clamps 303 and o-ring gasket 304 to releasably seal the bursting chamber, it should be appreciated that any arrangement for releasably sealing the chamber known in the art and capable of withstanding the vacuum pressures associated with this process is within the scope of this disclosure. By way of example, and without limiting the foregoing, the bursting chamber lid may have a gasket disposed between the lid and the body of the chamber and the lid may be secured to the body by nuts and threaded studs. The bursting chamber 300 may be fabricated from any material known in the art capable of withstanding the vacuum pressures associated with this process. By way of example and without limiting the foregoing, the bursting chamber may fabricated from acrylic polymer or steel. If the bursting chamber is fabricated from acrylic polymer it is transparent, so the user may monitor the progress of the bursting process in the chamber. On the other hand, if the bursting chamber 300 is fabricated from a material which is not transparent, such as steel, an aperture of transparent material may be provided in the bursting chamber, to allow the user to monitor the process taking place inside the chamber. The bursting chamber 300 may also be provided with valves 305 and 306. One of valves 305 or 306 may be used as a vent valve as described with respect to the process flow diagram of FIG. 1 and one of valves 305 or 306 may connect the bursting chamber 300 to the compressor as described with respect to the process flow diagram of FIG. 1. Finally a pressure indicator, such as gauge 307 may be provided to indicate the pressure in the bursting chamber 300. One of ordinary skill in the art will readily appreciate that any suitable pressure indicator can be used in place of gauge 307, including electronic pressure transducers or other sensors capable of measuring vacuum pressures associated with this process.

Figure 4:
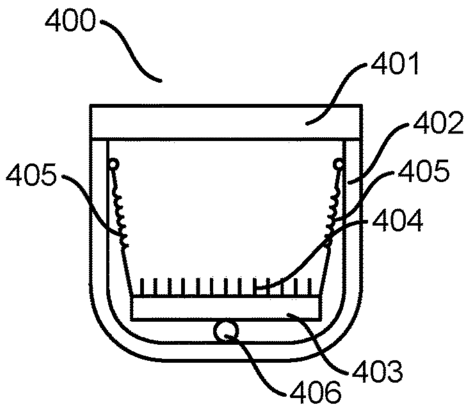
FIG. 4 is a cross-sectional view of a first embodiment of a bursting mechanism for the present system.

FIG. 4 shows a cross-sectional view of a first embodiment of bursting mechanism 400. In this cross-sectional view the bursting chamber has a lid 401 and a body 402. Disposed within the bursting chamber is a platform 403 with spikes 404. The platform 403 is secured to springs 405, which are further anchored to the interior surface of the bursting chamber body 402. A trigger mechanism 406 is disposed at the bottom of the bursting chamber and allows for the selective triggering of release of platform 403. It should be appreciated that the bursting mechanism 400 shown in FIG. 4 is shown in a ready to operate mode, i.e. that the springs 405 are under tension and that the system is held in the ready state by the trigger mechanism 406. When the trigger mechanism 406 is released, the spring force of the springs

405 draws the platform 403 up toward the underside of the lid 401, thereby impinging any balloons disposed between the lid 401 and the platform 403 on the spikes 404 and bursting said balloons. The trigger mechanism may be a mechanical linkage actuated by a user or it could be an electrical trigger, using magnets or electric current to release the platform upon activation by user. It will further be appreciated that as the user is preparing the system for operation, the user will put the bursting mechanism into the ready state by pushing down on the platform, thereby creating spring tension in the springs 405 and engaging the platform 403 with the trigger mechanism 406. It should further be appreciated that while the spikes 404 are shown on the platform 403, it would be equally acceptable to locate the spikes on the underside of lid 401 and thereby utilize a platform 403 with no spikes on it. Alternatively, the spikes 404 could be disposed on both the platform 403 and the underside of the lid 401. In another embodiment, the orientation of the elements shown in FIG. 4 may be reversed, i.e. the platform 403 may be secured by a trigger mechanism 406 to the lid 401 and the springs 405 may be disposed to pull the platform down toward the bottom of the bursting chamber.

Figure 5:
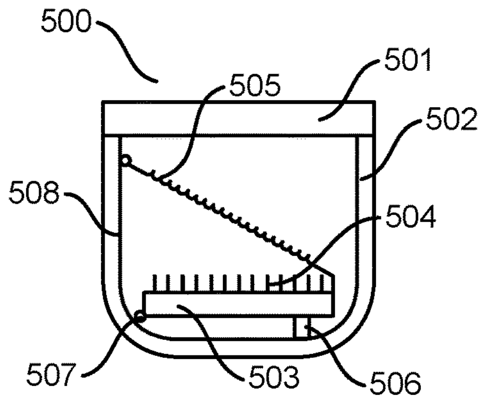
FIG. 5 is a cross-sectional view of a second embodiment of a bursting mechanism for the present system.

FIG. 5 shows a cross-sectional view of a second embodiment of bursting mechanism 500. In this cross-sectional view the bursting chamber has a lid 501 and a body 502. Disposed within the bursting chamber is a platform 503 with spikes 504. The platform 503 is secured to spring 505, which is further anchored to the interior surface of the bursting chamber body 502. The platform is also secured at a lower edge to a hinge 507. A trigger mechanism 506 is disposed at the bottom of the bursting chamber and allows for the selective triggering of release of platform 503. It should be appreciated that the bursting mechanism 500 shown in FIG. 5 is shown in a ready to operate mode, i.e. that the spring 505 is under tension and that the system is held in the ready state by the trigger mechanism 506. When the trigger mechanism 506 is released, the spring force of the spring 505 draws the platform 503 up toward the side wall 508 of the bursting chamber through the arc of rotation of the hinge 507, thereby impinging any balloons disposed between the side wall 508 and the platform 503 on the spikes 504 and bursting said balloons. The trigger mechanism may be a mechanical linkage actuated by a user or it could be an electrical trigger, using magnets or electric current to release the platform upon activation by user. It will further be appreciated that as the user is preparing the system for operation, the user will put the bursting mechanism into the ready state by pushing down on the platform, thereby creating spring tension in the spring 505 and engaging the platform 503 with the trigger mechanism 506. It should further be appreciated that while the spikes 504 are shown on the platform 503, it would be equally acceptable to locate the spikes on the side wall 508 and thereby utilize a platform 503 with no spikes on it. Alternatively, the spikes 504 could be disposed on both the platform 503 and the side wall 508. In another embodiment, the orientation of the elements shown in FIG. 5 may be reversed, i.e. the platform 503 may be secured by a trigger mechanism 506 side wall 508 and the springs 505 may be disposed to pull the platform down toward the bottom of the bursting chamber.

Figure 6:
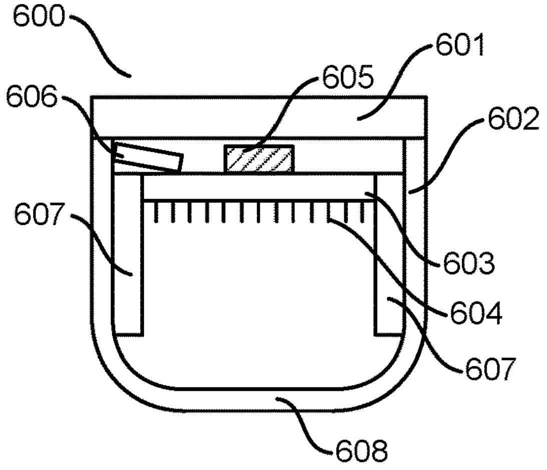
FIG. 6 is a cross-sectional view of a third embodiment of a bursting mechanism for the present system.

FIG. 6 shows a cross-sectional view of a third embodiment of bursting mechanism 600. In this cross-sectional view the bursting chamber has a lid 601 and a body 602. Disposed within the bursting chamber is a platform 603 with spikes 604. The platform 603 rides in a plurality of tracks 607, which are further anchored to the interior surface of the bursting chamber body 602. A trigger mechanism 606 is disposed at the top of the bursting chamber and allows for the selective triggering of release of platform 603. Additionally a weight 605 may be placed on top of the platform 603. It should be appreciated that the bursting mechanism 600 shown in FIG. 6 is shown in a ready to operate mode, i.e. that the system is held in the ready state by the trigger mechanism 606. When the trigger mechanism 606 is released, the platform 603 and weight 605 are pulled by gravity down the tracks 607, thereby impinging any balloons disposed between the platform 603 and the bottom surface of the bursting chamber 608 on the spikes 604 and bursting said balloons. The trigger mechanism may be a mechanical linkage actuated by a user or it could be an electrical trigger, using magnets or electric current to release the platform upon activation by user. It will further be appreciated that as the user is preparing the system for operation, the user will put the bursting mechanism into the ready state by positioning the platform 603 in the tracks 607, putting the weight 605 on top of the platform 603 and engaging the platform 603 with the trigger mechanism 606. It should further be appreciated that while the spikes 604 are shown on the platform 603, it would be equally acceptable to locate the spikes on the bottom surface of the bursting chamber 608 and thereby utilize a platform 603 with no spikes on it. Alternatively, the spikes 604 could be disposed on both the platform 603 and on the bottom surface of the bursting chamber 608.

Figure 7:
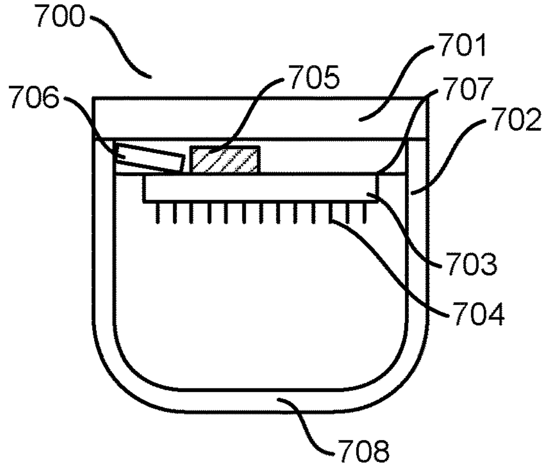
FIG. 7 is a cross-sectional view of a fourth embodiment of a bursting mechanism for the present system.

FIG. 7 shows a cross-sectional view of a fourth embodiment of bursting mechanism 700. In this cross-sectional view the bursting chamber has a lid 701 and a body 702. Disposed within the bursting chamber is a platform 703 with spikes 704. The platform 703 is connected to a hinge 707, which is further anchored to the interior surface of the bursting chamber body 702. A trigger mechanism 706 is disposed at the top of the bursting chamber and allows for the selective triggering of release of platform 703. Additionally a weight 705 may be placed on top of the platform 703. It should be appreciated that the bursting mechanism 700 shown in FIG. 7 is shown in a ready to operate mode, i.e. that the system is held in the ready state by the trigger mechanism 706. When the trigger mechanism 706 is released, the platform 703 and weight 705 are pulled down by gravity and swing through the rotational arc of hinge 707, thereby impinging any balloons disposed between the platform 703 and the side surface of the bursting chamber 708 on the spikes 704 and bursting said balloons. The trigger mechanism may be a mechanical linkage actuated by a user or it could be an electrical trigger, using magnets or electric current to release the platform upon activation by user. It will further be appreciated that as the user is preparing the system for operation, the user will put the bursting mechanism into the ready state by putting the weight 705 on top of the platform 703 and engaging the platform 703 with the trigger mechanism 706. It should further be appreciated that while the spikes 704 are shown on the platform 703, it would be equally acceptable to locate the spikes on the side surface of the bursting chamber 708 and thereby utilize a platform 703 with no spikes on it. Alternatively, the spikes 704 could be disposed on both the platform 703 and on the side surface of the bursting chamber 708.

Figure 8:
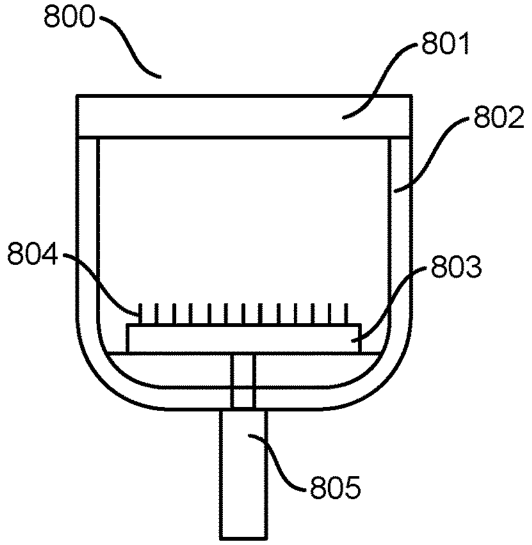
FIG. 8 is a cross-sectional view of a fifth embodiment of a bursting mechanism for the present system.

FIG. 8 shows a cross-sectional view of a fifth embodiment of a bursting mechanism 800. In this cross-sectional view the bursting chamber has a lid 801 and a body 802. Disposed within the bursting chamber is a platform 803 with spikes 804. The platform 803 is connected to a cylinder 805. Cylinder 805 may be a hydraulically or pneumatically operated cylinder. In operation, after loading the balloons into the bursting chamber 101, the user activates cylinder 805, which drives the platform 803 up toward the underside of the lid 801, thereby impinging any balloons disposed between the lid 801 and the platform 803 on the spikes 804 and bursting said balloons. It should further be appreciated that while the spikes 804 are shown on the platform 803, it would be equally acceptable to locate the spikes on the underside of the lid 801 and thereby utilize a platform 803 with no spikes on it. Alternatively, the spikes 804 could be disposed on both the platform 803 and on the underside of the lid 801. It should further be appreciated that the orientation of the components may be reversed, e.g. the cylinder 805 could be positioned on the lid 801 and drive the platform 803 downwards, so that the balloons were burst by contact between the platform 803 and the bottom surface of the body 802.

Figure 9:
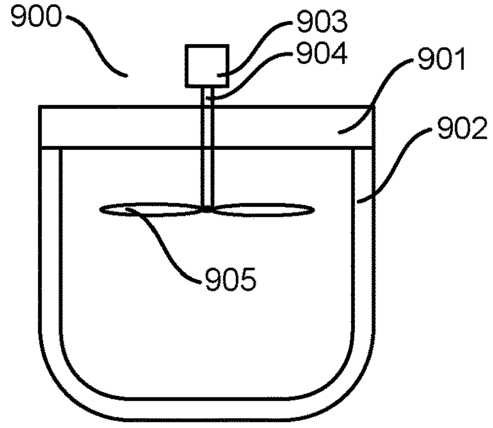
FIG. 9 is a cross-sectional view of a sixth embodiment of a bursting mechanism for the present system.

FIG. 9 shows a cross-sectional view of a sixth embodiment of a bursting mechanism 900. In this cross-sectional view the bursting chamber has a lid 901 and a body 902. On top of the lid 901 is a motor 903 connected via a shaft 904 to a set of rotating blades 905 disposed within the bursting chamber. In operation, after loading the balloons into the bursting chamber 101, the user activates the motor 903, which drives the rotating blades 905, bursting said balloons. It should further be appreciated that while the rotating blades 905 are shown, it would be equally acceptable to use, for example, paddles with spikes on them to accomplish the bursting function in this embodiment. One of ordinary skill will readily appreciate that any motor driven bursting apparatus could be used in place of the blades 905 shown in FIG. 9.

Figure 10:
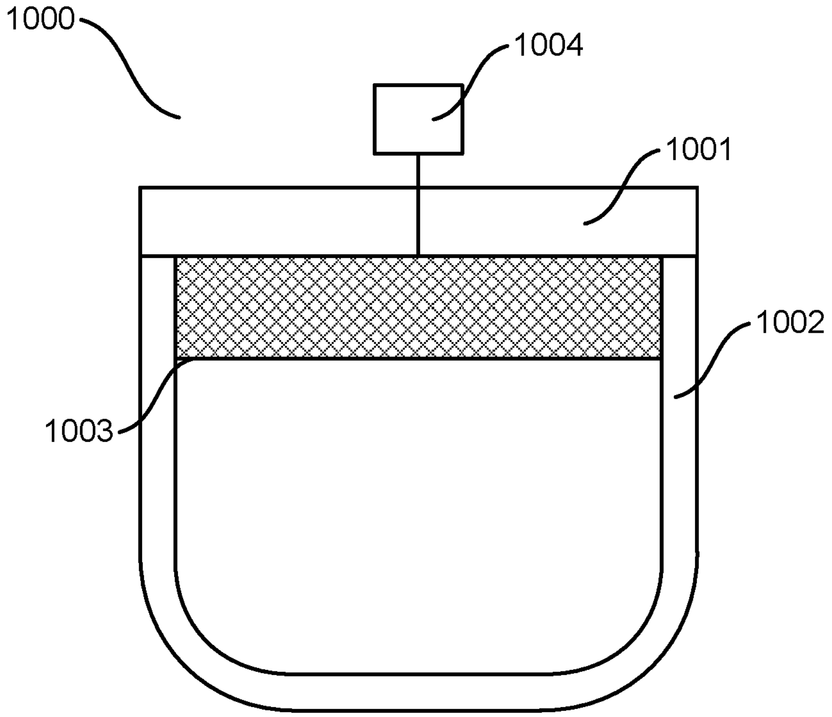
FIG. 10 is a cross-sectional view of a seventh embodiment of a bursting mechanism for the present system.

FIG. 10 shows a cross-sectional view of a seventh embodiment of a bursting mechanism 1000. In this cross-sectional view the bursting chamber has a lid 1001 and a body 1002. Disposed within the bursting chamber is an array of resistive heating elements 1003, in electrical communication with a controller 1004 outside the bursting chamber. In operation, after loading the balloons into the bursting chamber 101, the user activates the controller 1004, to turn on the resistive heating elements 1003. When the balloons come in contact with the resistive heating elements 1003, they are melted, thereby bursting said balloons. It should further be appreciated that while the resistive heating elements 1003 are shown, it would be equally acceptable to use other forms of heating elements to accomplish the bursting function in this embodiment. One of ordinary skill will readily appreciate that any heating element capable of heating the balloon material to a point where bursting may occur is within the scope of this disclosure.

Figure 11A:
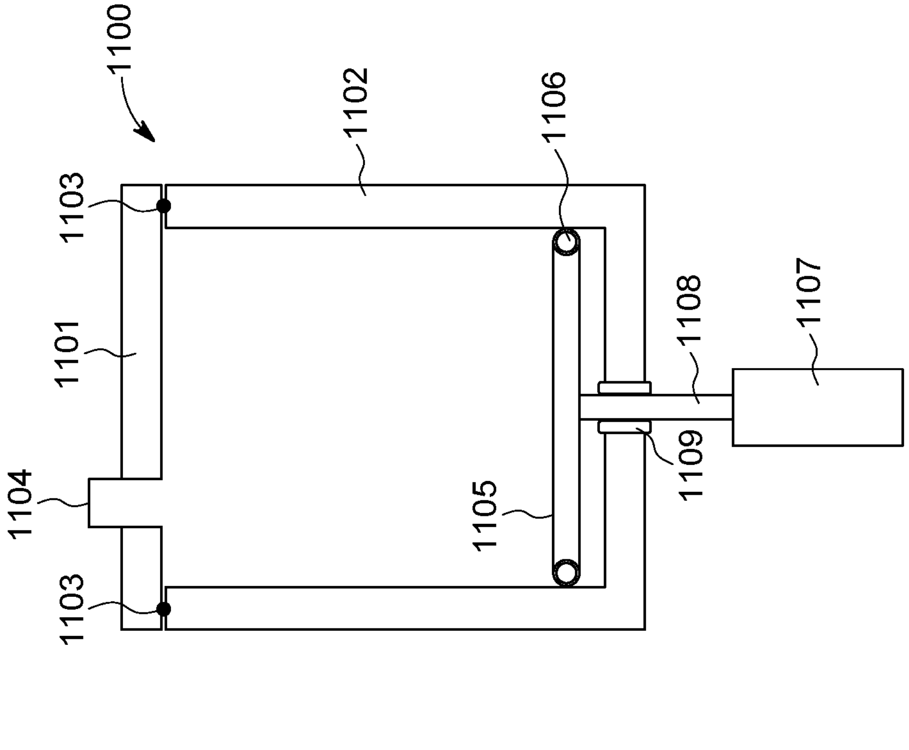
FIGS. 11*a* and 11*b* are cross-sectional views of an alternate embodiment of a bursting chamber for the present system.
Figure 11B:
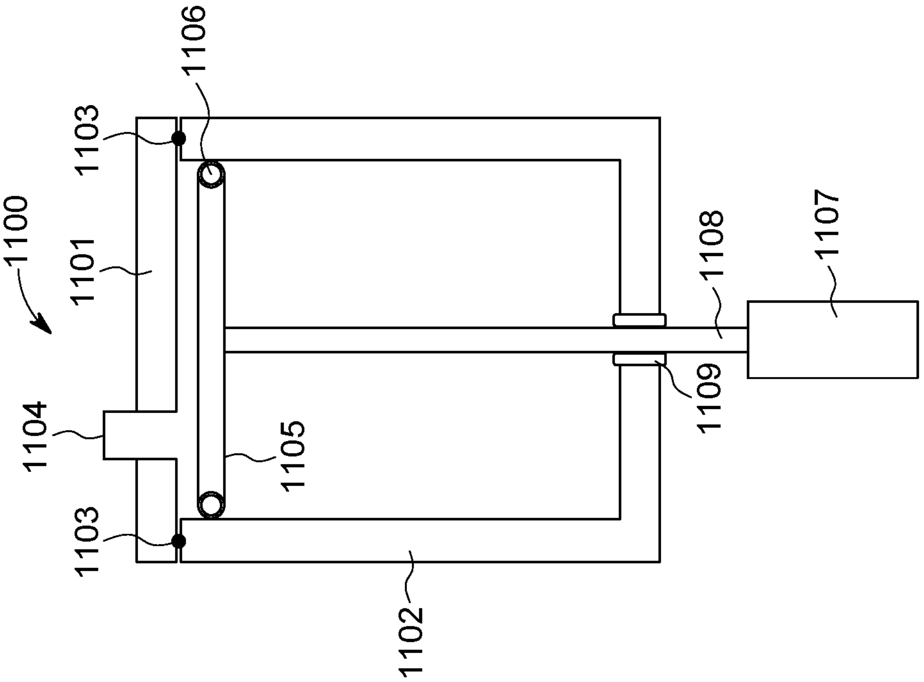

FIGS. 11*a* and 11*b* are cross-sectional views of an alternate embodiment of a bursting chamber for the present system. FIG. 11*a* shows the alternate embodiment of the bursting chamber 1100 in a retracted position, and FIG. 11*b* shows the bursting chamber 1100 in an extended position. It should be appreciated that the same elements which were discussed in the description of the bursting chamber in FIG. 3 are also present in the bursting chamber 1100. For example, the bursting chamber 1100 has a lid 1101 and a body 1102. FIGS. 11*a* and 11*b* show cross-sections of the bursting chamber, but it should be appreciated that the bursting chamber 1100 has generally cylindrical shape. As with the bursting chamber described in FIG. 3, the bursting chamber 1100 is provided with an arrangement for releasably sealing the chamber. For instance, an o-ring 1103 may be disposed in a gland around the circumference of the top opening of the body 1102, and the lid 1101 may be sealed with clamps (not shown) to the body, thereby creating an air-tight seal. It should be appreciated that any arrangement for releasably sealing the chamber known in the art and capable of withstanding the vacuum pressures associated with this process is within the scope of this disclosure. By way of example, and without limiting the foregoing, the bursting chamber lid may have a gasket disposed between the lid and the body of the chamber and the lid may be secured to the body by nuts and threaded studs. The bursting chamber 1100 may be fabricated from any material known in the art capable of withstanding the vacuum pressures associated with this process, including up to 29.92 inches of mercury. By way of example and without limiting the foregoing, the bursting chamber may fabricated from acrylic polymer or steel. If the bursting chamber is fabricated from acrylic polymer it is transparent, so the user may monitor the progress of the bursting process in the chamber. On the other hand, if the bursting chamber 1100 is fabricated from a material which is not transparent, such as steel, an aperture of transparent material may be provided in the bursting chamber, to allow the user to monitor the process taking place inside the chamber.

It should be appreciated that the bursting chamber shown in FIGS. 11*a* and 11*b* does not have a bursting mechanism disposed within it. In use, one of the forms of bursting mechanisms shown and disclosed in FIGS. 4 through 10 are disposed inside the bursting chamber to accomplish the bursting function.

The bursting chamber 1100 may also be provided with outlet 1104. Outlet 1104 may be provided with valves (not shown) that may be used as a vent valve as described with respect to the process flow diagram of FIG. 1. Additionally, outlet 1104 connects the bursting chamber 1100 to the compressor as described with respect to the process flow diagram of FIG. 1. Finally a pressure indicator, such as gauge (not shown) may be provided to indicate the pressure in the bursting chamber 1100. One of ordinary skill in the art will readily appreciate that any suitable pressure indicator can be used, including electronic pressure transducers or other sensors capable of measuring vacuum pressures associated with this process.

As can be seen in FIGS. 11*a* and 11*b*, it should be appreciated that the interior volume of the bursting chamber 1100 can be changed by means of a piston 1105. The piston 1105 may be provided with a gland and an o-ring 1106 to seal the interface between the piston 1105 and the inner walls of the bursting chamber 1100 to make a vacuum-tight and gas-tight seal. It should be appreciated that while FIGS. 11*a* and 11*b* show only a single o-ring seal 1106 on the piston 1105, it may be advantageous to provide more than one o-ring seal 1106 and such additional o-rings are within the scope of this disclosure. The piston 1105 may be moved from its retracted position (shown in FIG. 11*a*) to its extended position (shown in FIG. 11*b*) by a hydraulic cylinder 1107 and shaft 1108. Hydraulic cylinder 1107 may be any standard hydraulic cylinder known in the art with sufficient power to move the piston 1105 in the interior of the bursting chamber 1100. The shaft 1108 may be provided with a seal 1109 to further prevent the ingress of air into the system. The seal 1109 may be an o-ring or it may be a spring energized seal. It should be further appreciated that while FIGS. 11*a* and 11*b* show a single seal 1109, two or more seals 1109 could be provided in the assembly as needed to prevent the ingress of air into the system.

In operation, the bursting chamber 1100 shown in FIGS. 11*a* and 11*b* initially has the piston 1105 in the retracted position of FIG. 11*a*. Balloons would then be charged to the bursting chamber, and the chamber is evacuated, as discussed with respect to step 203 shown in FIG. 2. Following evacuation of the chamber, the balloons are burst as discussed in step 204 shown in FIG. 2. During the evacuation of the helium in step 205 shown in FIG. 2, the piston 1105 is moved to the extended position of FIG. 11*b*. In this way, the piston 1105 forces the helium out of the bursting chamber and through the compressor.

It will be appreciated by those of ordinary skill in the art that, while the forgoing disclosure has been set forth in connection with particular embodiments and examples, the disclosure is not intended to be necessarily so limited, and that numerous other embodiments, examples, uses, modifications and departures from the embodiments, examples and uses described herein are intended to be encompassed by the claims attached hereto. Various features of the disclosure are set forth in the following claims.

I claim:

1. A system, comprising:

a bursting chamber with a re-sealable lid and a vent;

a bursting mechanism disposed inside the bursting chamber;

wherein the bursting chamber is in fluid communication with a compressor;

wherein the bursting chamber has a piston with at least one seal, the seal creating a vacuum-tight and gas-tight seal around the piston;

wherein the piston is operatively connected to a hydraulic cylinder and the piston is moveable by the hydraulic cylinder from a retracted position to an extended position; and wherein moving the piston from the retracted position to the extended position forces helium from burst balloons out of the bursting chamber and to the compressor; and wherein an output of the compressor is in fluid communication with an evacuation valve and a control valve;

wherein when the evacuation valve is opened and the control valve is closed the compressor evacuates the air from the bursting chamber; and wherein when the evacuation valve is closed and the control valve is opened, and the bursting mechanism is activated, compressed helium gas recovered from balloons burst in the bursting chamber flows through the control valve into a helium storage tank.

2. The system of claim 1, wherein the bursting chamber is able to structurally withstand a vacuum of at least 29.9 inches of mercury.

3. The system of claim 1, wherein the system is either manually controlled or automatically controlled.

4. The system of claim 1, wherein the bursting chamber is provided with a pressure indicator.

5. The system of claim 1, wherein the compressor is selected from the group comprising positive displacement compressors and dynamic compressors.

6. The system of claim 1, wherein the compressor is cooled by air, water or other fluids or is un-cooled.

7. The system of claim 1, wherein the compressor has a single stage or has multiple stages.

8. The system of claim 1, wherein two or more compressors are operated in series to achieve a desired final pressure of helium in the helium storage tank.

9. The system of claim 1, wherein the compressor is manually-controlled or is electrically-actuated.

10. The system of claim 1, wherein the evacuation valve and the control valve are manually-controlled valves or are electrically actuated valves.

11. The system of claim 1, wherein the control valve is provided with a one-way check valve fitting to prevent a backflow of compressed helium gas out of the helium storage tank.

12. The system of claim 1, wherein recycled helium collected in the helium storage tank is used in a way selected from the group comprising: the recycled helium is used as-is to fill new balloons; the recycled helium is blended with virgin helium and then used to fill new balloons; the recycled helium is purified and/or compressed to a higher pressure and the resultant purified and/or compressed helium is used for filling balloons; the recycled helium is re-purposed for a use other than filling balloons.

13. The system of claim 1, wherein the bursting mechanism disposed inside the bursting chamber comprises:

a plurality of springs having a first end and a second end;

a platform with spikes secured to the first end of the springs;

said springs further anchored at the second end to an interior surface of the bursting chamber;

a trigger mechanism disposed at the bottom of the bursting chamber which allows for the selective triggering of release of the platform;

wherein when said trigger mechanism is released, the springs draw the platform up toward an underside of the lid of the bursting chamber, thereby impinging any balloons disposed between the lid and the platform on the spikes and bursting said balloons.

14. The system of claim 1, wherein the bursting mechanism disposed within the bursting chamber comprises:

a spring having a first end and a second end;

a platform with spikes secured to the first end of the spring;

said spring further anchored at the second end to an interior surface of the bursting chamber;

said platform connected by a hinge to the interior surface of the bursting chamber;

a trigger mechanism disposed at the bottom of the bursting chamber which allows for the selective triggering of release of the platform;

wherein when said trigger mechanism is released, the spring draws the platform up toward a side wall of the bursting chamber and through a rotational arc of the hinge, thereby impinging any balloons disposed between the side wall and the platform on the spikes and bursting said balloons.

15. The system of claim 1, wherein the bursting mechanism disposed within the bursting chamber comprises:

a platform with spikes;

a plurality of tracks anchored to an interior surface of the bursting chamber, wherein the platform is configured to ride in the plurality of tracks;

a weight;

a trigger mechanism disposed at the top of the bursting chamber which allows for the selective triggering of release of the platform;

wherein when said trigger mechanism is released, the platform and weight are pulled by gravity down the tracks, thereby impinging any balloons disposed between the platform and a bottom surface of the bursting chamber on the spikes and bursting said balloons.

16. The system of claim 1, wherein the bursting mechanism disposed within the bursting chamber comprises:

a platform with spikes, said platform connected by a hinge to an interior surface of the bursting chamber;

a weight;

a trigger mechanism disposed at the top of the bursting chamber which allows for the selective triggering of release of the platform;

wherein when said trigger mechanism is released, the platform and weight are pulled down by gravity and swing through a rotational arc of the hinge, thereby impinging any balloons disposed between the platform and the side surface of the bursting chamber on the spikes and bursting said balloons.

17. The system of claim 1, wherein the bursting mechanism disposed within the bursting chamber comprises:

a platform with spikes;

said platform connected to a hydraulic cylinder secured to the bottom of the bursting chamber;

wherein the user activates the hydraulic cylinder driving the platform up toward the underside of the lid of the bursting chamber thereby impinging any balloons disposed between the lid and the platform on the spikes and bursting said balloons.

18. The system of claim 1, wherein the bursting mechanism disposed within the bursting chamber comprises:

a motor connected via a shaft passing through the lid of the bursting chamber to a set of rotating blades disposed within the bursting chamber; wherein the user activates the motor, which drives the rotating blades, bursting any balloons in the bursting chamber.

19. The system of claim 1, wherein the bursting mechanism disposed within the bursting chamber comprises:

an array of resistive heating elements in electrical communication with a controller outside the bursting chamber;

wherein a user activates the controller to turn on the resistive heating elements and when balloons come in contact with the resistive heating elements they are melted, thereby bursting said balloons.

* * * * *